United States Patent [19]

Scott

[11] 4,364,205
[45] Dec. 21, 1982

[54] PORTABLE STRUCTURE AND METHOD OF ERECTING SAME

[75] Inventor: William A. Scott, Winnipeg, Canada

[73] Assignees: Don Fell Limited; Gordon Fell Limited; Lawrence Fell Limited, all of Ontario, Canada

[21] Appl. No.: 220,138

[22] Filed: Dec. 24, 1980

Related U.S. Application Data

[63] Continuation-in-part of Ser. No. 45,975, Jun. 6, 1979, abandoned.

[30] Foreign Application Priority Data

Jun. 16, 1978 [CA] Canada .................................. 305673

[51] Int. Cl.³ .............................................. E04D 1/34
[52] U.S. Cl. ................................................ 52/4; 52/63; 52/745
[58] Field of Search ...................... 52/3, 4, 5, 745, 63, 52/192

[56] References Cited

U.S. PATENT DOCUMENTS

| | | | |
|---|---|---|---|
| 2,251,502 | 8/1941 | Smith | 52/63 |
| 2,635,302 | 4/1953 | Denning | 52/63 |
| 2,730,150 | 1/1956 | Wunderwald et al. | 52/4 |
| 3,205,898 | 9/1965 | Sprague | 52/3 X |
| 3,375,831 | 4/1968 | Serbus | 52/63 |
| 3,727,656 | 4/1973 | Luders | 52/3 X |
| 4,084,358 | 4/1978 | Winters | 52/4 |
| 4,121,389 | 10/1978 | Ptaszek | 52/192 X |

FOREIGN PATENT DOCUMENTS 550885 1/1942 United Kingdom .

OTHER PUBLICATIONS

Public use as described in the declarations filed in relation to the change of inventorship in Parent Application 45,975.

Primary Examiner—Price C. Faw, Jr.
Assistant Examiner—Carl D. Friedman
Attorney, Agent, or Firm—Larson and Taylor

[57] ABSTRACT

A portable grain storage bin for storing grain and a method of erecting same is disclosed. The bin comprises an outer circular wall composed of wire mesh which is pegged to the ground, and an inner plastic lining material which is closed at the top after filling of the bin.

18 Claims, 19 Drawing Figures

PORTABLE STRUCTURE AND METHOD OF ERECTING SAME

CROSS REFERENCE

This application is a continuation-in-part of application Ser. No. 45,975 filed June 6, 1979, now abandoned.

BACKGROUND OF THE INVENTION

This invention relates to a portable structure particularly suited for use as a bin for storage of agricultural products such as grain.

Grain storage can be a problem for farmers because the volume required to be stored varies greatly from time to time and place to place. It is often not economically feasible for a farmer to maintain a permanent grain storage facility capable of handling the maximum amount of grain which he might wish to store.

Moreover maximum storage requirements cannot be predicted since they occur as a result of such diverse and uncertain factors as crop yield, market conditions, transportation, weather, etc.

It is thus desirable that a portable storage means be available which can be stocked by local dealers and can be purchased and transported by the farmer for quick and immediate erection.

Accordingly it is an object of the present invention to provide a portable structure particularly suited for storage of grain which when not erected is relatively compact and is capable of being stocked by dealers in the locality of farming areas.

It is a further object of this invention to provide a grain storage bin with which grain loading and unloading is relatively easy.

It is a further object of this invention to provide a relatively low cost portable structure which can be readily transported and can be erected with a minimum of manpower and complexity.

It is a further object of this invention to provide a portable structure which provides protection to its contents against rodents, insects and weather.

It is a further object of this invention to provide a grain storage bin which is capable of being loaded and unloaded with its top open to the atmosphere. This is an important safety consideration.

It is still a further object of this invention to provide a method of erecting a portable structure which can be carried out with a minimum of labour, skill and time.

BRIEF SUMMARY OF THE INVENTION

In accordance with this invention there is provided apparatus for assembling into a structure suitable for storage of material such as grain, comprising a wire mesh strip adapted to form an outer circular support wall, a shaped, single piece flexible plastic liner having a circular floor extending at its periphery into a cylindrical wall with an open top, said cylindrical wall being adapted to provide an inner wall contacting and circumscribed by said outer support wall upon assembly of said structure, said cylindrical wall being further adapted to provide a roof portion upon assembly of said structure, means for bringing together the open top of the cylindrical wall to close the structure after assembly and loading to provide a weather-proof enclosure and a flexible generally conically shaped plastic cover adapted to fit over the roof portion, the outer surface of said cover having a silver coating to render it reflective to sunlight.

In accordance with another aspect of this invention there is provided apparatus for assembling into a structure suitable for storage of material such as grain, comprising a wire mesh strip adapted to form an outer circular support wall, a shaped, single piece flexible plastic liner having a circular floor extending at its periphery into a cylindrical wall with an open top, said cylindrical wall being adapted to provide an inner wall contacting and circumscribed by said outer support wall upon assembly of said structure, said cylindrical wall being further adapted to provide a roof portion upon assembly of said structure, means for bringing together the open top of the cylindrical wall to close the structure after assembly and loading to provide a weather-proof enclosure and a flexible strip of rodent proof material for placement between the base of the cylindrical wall of the liner and the wire mesh.

In accordance with a still further aspect of this invention there is provided a method of assembling a portable structure on a surface for storage of material such as grain, comprising the steps of (a) erecting a first portion of a wire mesh outer support wall in a semi-circle; (b) fastening to the erected portion of the support wall a portion of a flexible plastic liner having a circular floor extending at its periphery into a cylindrical wall with an open top; (c) placing a flexible strip of hard material between the base of the wire mesh and the flexible plastic lining; (d) erecting the remaining portion of the wire mesh support wall to form a closed circle and fastening the plastic liner thereto; (e) draping an upper portion of the cylindrical wall of the plastic liner over the top of the support wall; (f) temporarily anchoring the top of the support wall; (g) filling the structure with said material up to the level of the top of the support wall at the periphery with the material forming a cone towards the center, the top of the structure being entirely open during such filling step; and (h) removing the temporary anchoring and bringing together the open top of the plastic liner over said cone to form a roof portion to enclose said material.

DESCRIPTION OF PREFERRED EMBODIMENTS

Figure 1:
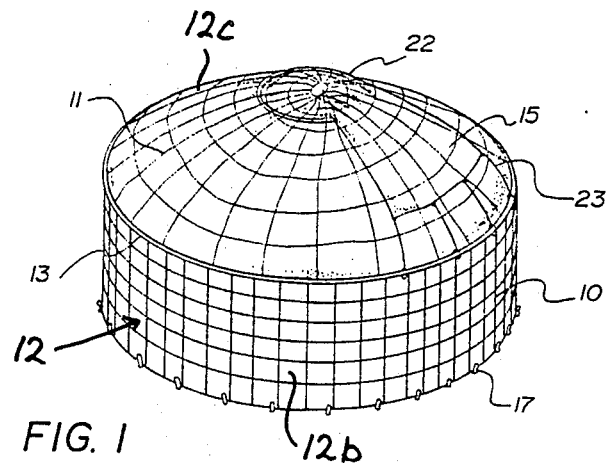
FIG. 1 illustrates a filled storage structure.
Figure 2:
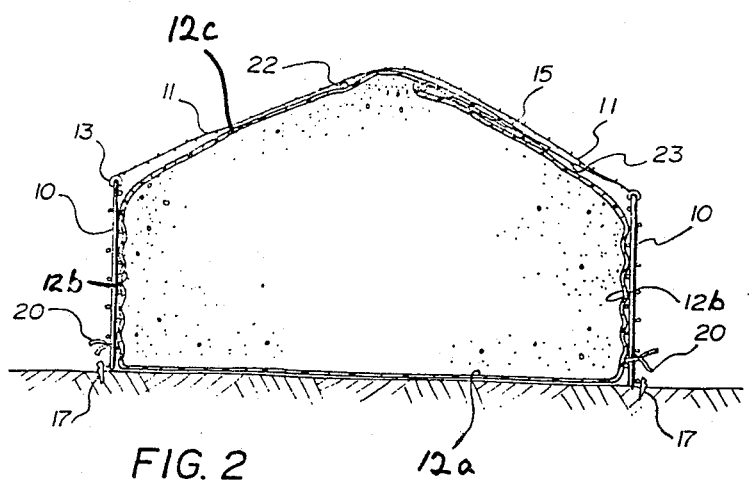
FIG. 2 is a sectional view through the centre of the structure illustrated in FIG. 1.
Figure 5:
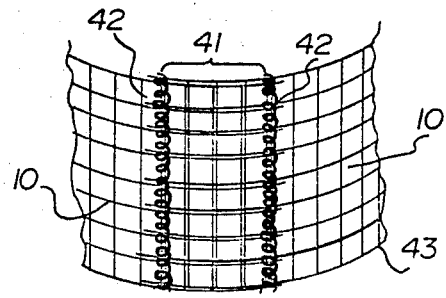
FIG. 5 illustrates spiral connecting means for connecting the ends of a wire mesh wall.

As shown in FIGS. 1 and 2 an assembled storage structure comprises a shaped, single piece, flexible, plastic liner 12 having a circular floor 12a extending at its periphery into a cylindrical wall 12b. Before filling, the cylindrical wall 12b has an open top. After filling, the upper part of the wall 12b is folded in to form a roof portion 12c and provide a weatherproof enclosure. An external support wall 10 provides lateral support to the plastic liner 12. The wall 10 which is cylindrical in form is composed of wire mesh strip the overlapping ends of which can be joined by means of coil connectors 42 (FIG. 5). These connectors 42 consist of wire coils having a pitch of approximately one inch and a diameter of approximately one inch. To form the outer wall 10 the ends of the wire mesh are overlapped as shown by reference numeral 41 and each coil is threaded into place by a screwing action so that it surrounds and connects vertical wires on opposite ends of the wire mesh strip. The wall 10 is anchored to the ground by pegs 17 (FIGS. 1 and 2), as will be more fully described below.

Figure 7:
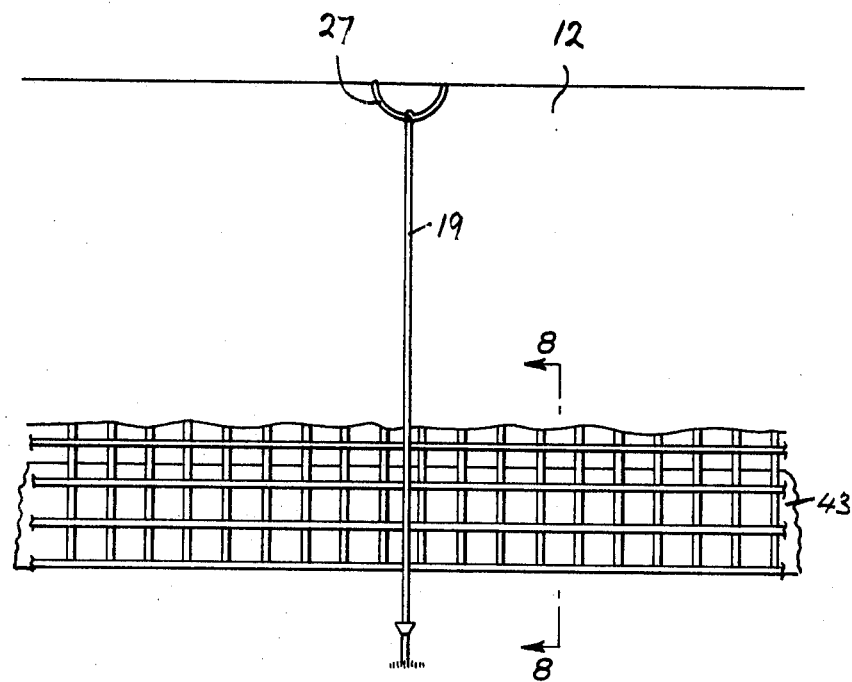
FIG. 7 is an enlarged fragmentary view of a portion of FIG. 3F with part of the liner cut away.
Figure 8:
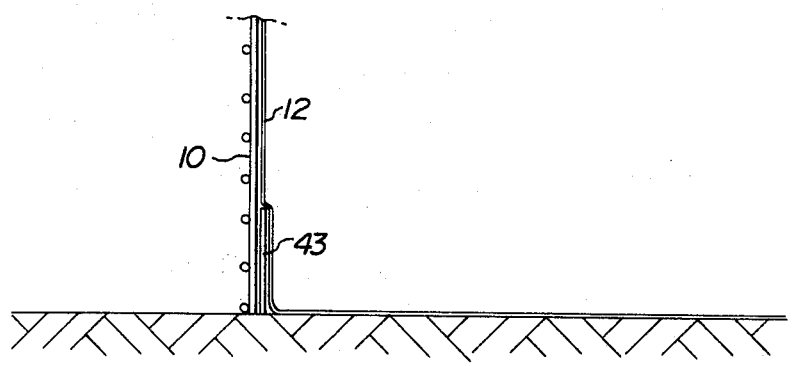
FIG. 8 is a section on 8—8 in FIG. 7.

Mounted along the top of the wall 10 is a protective strip of U-shaped plastic tubing 13 fitted over the top edge of the wire mesh. This plastic tubing 13 is adapted to protect the liner 12 against being torn by the top of the wall 10 during assembly of the structure and during loading and unloading, as is more fully described below. A rodent guard 43 (FIGS. 4, 7 and 8) consisting of a flexible strip of hard material such as metal or heavy polyethylene approximately one foot high and of a length somewhat greater than the diameter of the structure, is placed against the inside bottom of the wall 10 outside the liner. The purpose of the strip 43 is to prevent rodents from eating through the liner.

As shown in FIGS. 1 and 2, cords 23 are fixed to the top of the wall portion of the liner for the purpose of securing it closed, after filling. Ties 20 (FIG. 2) are fixed to the outside of the liner 12 above its floor portion for the purpose of securing the liner to the wall 10. It has been found that it is of assistance in the erection of the structure to have a line 24 (FIG. 3F) on the inside surface of the wall portion 12b of the liner 12 coinciding with the top of the wall 10, when assembled. It is also useful for assembly purposes to have a seam or line 26 (FIG. 3F) marking a diameter on the floor portion 12a.

The structure can be erected by two men using the following steps.

Figure 3A:
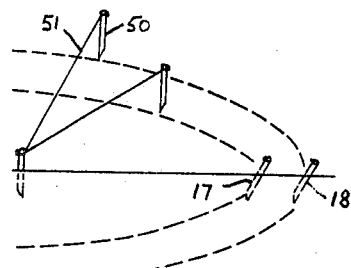
FIGS. 3A to 3I illustrate stages in the erection and filling procedure.

(a) Using a peg 50 and a cord 51 (FIG. 3A), two concentric circles are marked on the ground.

Figure 3B:
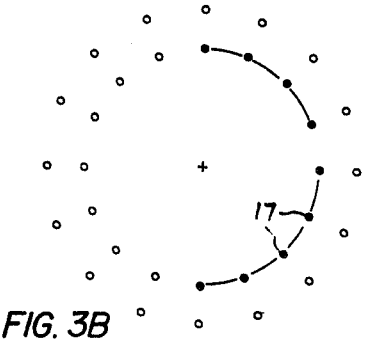
Figure 3C:
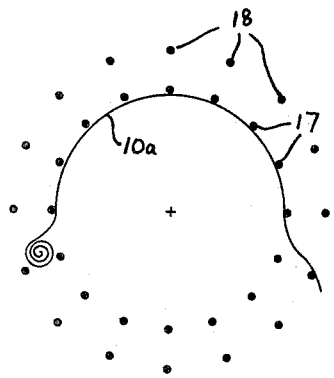

(b) Pegs 17, 18 are driven into the ground (FIGS. 3B and 3C) at regular intervals on the two circles.

(c) One half 10a of the wire mesh strip (FIG. 3C) that forms the outer wall, is unwound and is set up on a half circle immediately inside the inner circle of pegs 17. Part of the rodent guard 43 is placed inside the base of the standing wire mesh strip.

(d) The bottom wire of the mesh 10a is hooked under the hooks of pegs 17.

Figure 3D:
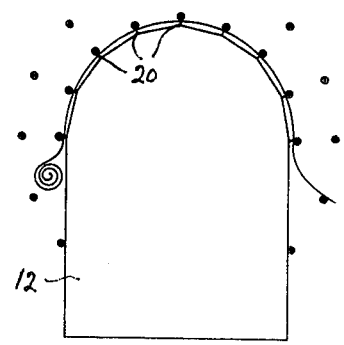

(e) The liner 12 is fastened to the wire mesh 10a by means of ties 20 attached to the liner (FIG. 3D). The entire liner 12 is then completely placed inside the inner circle of pegs.

Figure 3E:
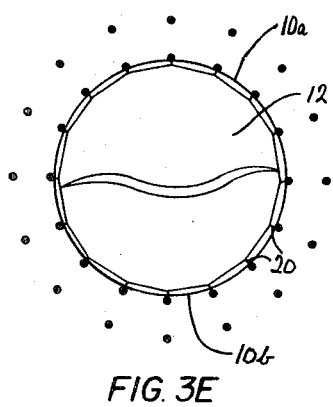

(f) The remaining half 10b of the wire mesh strip is uncoiled, positioned inside the inner circle and hooked to the remaining pegs 17 (FIG. 3E). The remaining portion of the rodent guard 43 is positioned between the liner and the wire mesh strip with the ends of the guard overlapping. As already explained in relation to FIG. 5, the ends of the wire mesh strip are overlapped and firmly secured by use of the spiral wire connectors 42, to complete the circular wall (FIG. 3E).

(g) The protective plastic tubing 13 (FIG. 2) is then mounted on top of the wire mesh circular wall 10, any remaining ties 20 on the liner 12 are tied to the wire mesh and the top portion 12d of the cylindrical wall 12b of the plastic liner 12 is draped over the top of the wall 10 (FIG. 3F) with an excess of material lying on the ground at 12e. At this point it will be seen that the diametrical line 26 on the floor of the liner should be straight, the line 25 marking the outside of the floor 12a should coincide with the bottom of the wall 12b and the line 24 on the inside of the wall 12b should coincide with the top of the wall 10.

(h) In order to temporarily secure the structure against winds until it is filled, it is anchored by means of hooks 27 (FIGS. 3F and 7) which are attached to the pegs 18 in the outer circle by cords 19. Hooks 27 are adapted to prevent snagging or tearing of the liner 12.

Figure 3F:
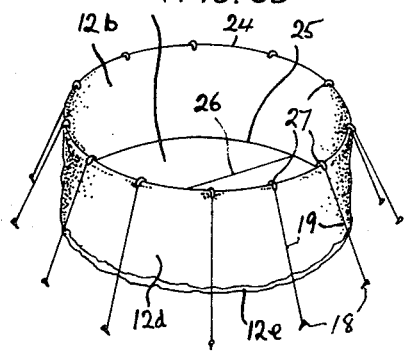
Figure 3G:
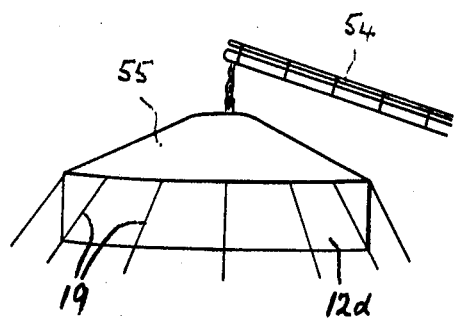

(i) The structure shown in FIG. 3F is now ready for filling. During filling the auger 54 should be placed directly over the centre of the structure (FIG. 3G). The ability to load and unload the structure with the top completely open avoids the danger associated with filling closed containers with grain. It will be appreciated that, in filling the structure, the top of the grain assumes a conical shape 55 with an angle corresponding to the angle of repose of the grain.

Figure 3H:
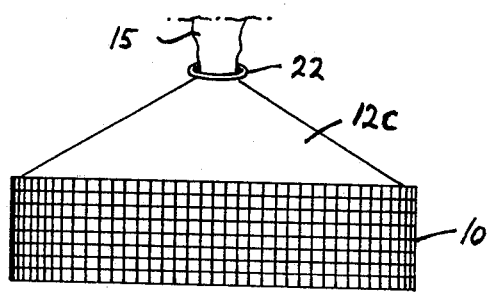
Figure 3I:
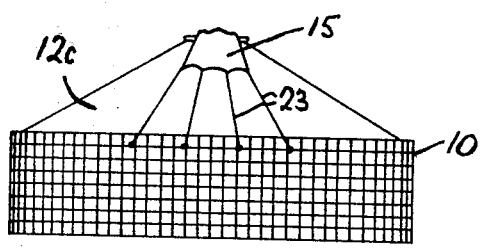

(j) After the structure has been filled, the anchoring means 18, 19 and 27 are removed and the upper portion 12d of the cylindrical wall 12b of the plastic liner 12 which has been draped over the support wall 10 is placed over the top of the grain (FIG. 3H) to form the roof portion 12c. The liner 12 top is then gathered at the centre and passed through a hoop 22 and the resulting flap 15 is tied down to the wall 10 by means of the cords 23 (FIGS. 3I). Since the angle of the top surface of the grain is the angle of repose of the grain the upper portion of the liner wall 12b that forms the roof 12c merely rests against the grain and there is no lateral pressure on this portion of the liner and hence no need for additional support.

(k) A netting 11 (FIGS. 1 and 2) is then placed over the entire roof portion 12c of the structure and is secured to the wall 10 to prevent disturbance by high winds.

Figure 4:
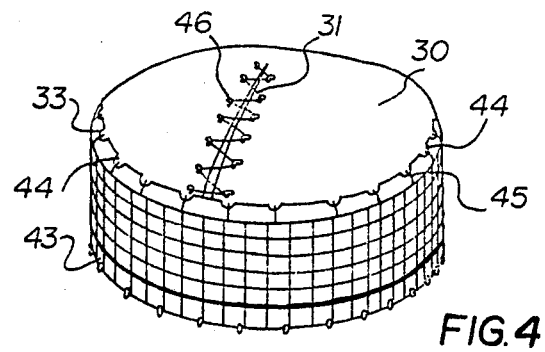
FIG. 4 illustrates the structure fitted with a generally conical plastic cover.

(l) Greater protection is then provided by the application of an outer, conical, impervious plastic cover 30 shown in FIG. 4, either in addition to or instead of the netting 11. This cover 30 is installed by placing the cover centrally over the top of the structure as seen in FIGS. 1 and 2 and then attaching tie down ropes 45 from ears 44 on the cover to the top of the wire mesh wall 10. The lacing 31 on the cover is then tightened to provide a covering that is secure against the weather. The cover material is preferably silver coated to reflect sunlight. It has been found that a woven polyethylene sold under the trade mark FABRENE is suitable both for the lining and the cover. Provision of the lacing 31 permits the angle of the cone to be varied in accordance with the angle of repose of the material stored. The lacing is fed through rings 46 so that tightening of the laces causes the cover to tighten in conformity with the cone angle of the stored material.

Figure 6A:
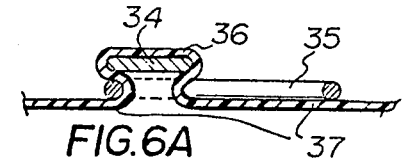
FIG. 6A is a cross-sectional view of a grommet fastener for attaching tie down ropes to the plastic cover.
Figure 6B:
FIG. 6B illustrates a button used in the grommet fastener of FIG. 6A.
Figure 6C:
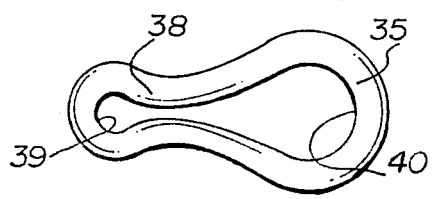
FIG. 6C illustrates a ring used in the grommet fastener of FIG. 6A.
Figure 6D:
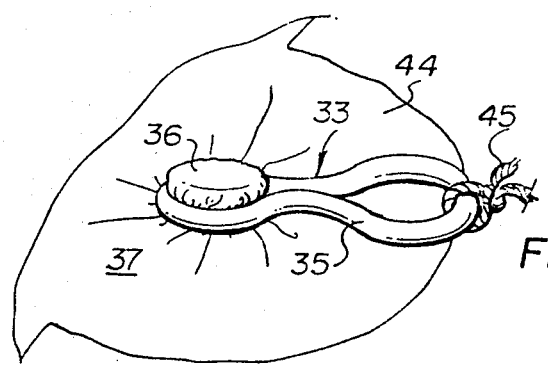
FIG. 6D is a perspective view of the grommet fastener of FIG. 6A.

(m) Along the bottom edge of the cover 30 there is a series of regularly spaced semi-circular ears 44. Each of these ears 44 includes a grommet fastener 33 (FIG. 6D) for attaching a tie down rope 45 thereto. The grommet fastener 33 includes a button 34 which is surrounded by the plastic covering material 37 of the ear 44. A ring portion 35 of the grommet fastener consists of a large diameter opening 40 and a small diameter opening 39 which are joined by a neck portion 38. The fastener is assembled by inserting the button 34 with the plastic cover material surrounding it through the large diameter opening 40 of the ring 35 and then laterally moving the ring so that the button and surrounding plastic move through the neck portion 38 and into the smaller diameter opening 39 of the ring. The plastic material is thus caused to bunch which, together with the reduced neck portion 38, enables the ring to be held in that position. The tie down ropes 45 are attached to the large diameter portion 40 of the ring and are tied to the top of the wall 10. It has been found that this type of fastener provides a strong attachment means which is resistant to tearing and is easily assembled. By attaching the grommets to the ears 44 that project from the bottom edge of the cover 30, rather than to the cover itself, no reduction in the bottom diameter of the cover is experienced due to bunching of the material of the cover itself, and the latter remains flat and free of creases, bumps or other irregularities.

In the event that aeration of the contents of the structure is required the flap 15 may be untied and an aerator introduced through the opening in the liner inside the hoop 22.

It has been found that in accordance with this invention, a structure capable of a storage capacity of 2500 bushels can be erected from materials having a shipping weight of 190 pounds. This particular structure has a diameter of 24 feet and a wall height of 5 feet and uses 10 gage wire mesh for the external supporting walls. Structures having a diameter of 32 feet and a capacity of 5000 bushels have also been built.

It should be appreciated that modifications in the arrangements shown may be made without departing from the true spirit of the invention. Therefore, such modifications and equivalents fall within the scope of the appended claims.

I claim:

1. Apparatus for assembling into a structure suitable for storage of material such as grain, comprising a wire mesh strip adapted to form an outer circular support wall, a shaped, single piece flexible plastic liner having a circular floor extending at its periphery into a cylindrical wall with an open top, said cylindrical wall being adapted to provide an inner wall contacting and circumscribed by said outer support wall upon assembly of said structure, said cylindrical wall being further adapted to provide a roof portion upon assembly of said structure, means for bringing together the open top of the cylindrical wall to close the structure after assembly and loading to provide a weather-proof enclosure and a flexible generally conically shaped plastic cover adapted to fit over the roof portion, the outer surface of said cover having a silver coating to render it reflective to sunlight.

2. Apparatus according to claim 1 including a flexible strip of rodent proof material for placement between the base of the cylindrical wall of the liner and the wire mesh.

3. Apparatus for assembling into a structure suitable for storage of material such as grain, comprising a wire mesh strip adapted to form an outer circular support wall, a shaped, single piece flexible plastic liner having a circular floor extending at its periphery into a cylindrical wall with an open top, said cylindrical wall being adapted to provide an inner wall contacting and circumscribed by said outer support wall upon assembly of said structure, said cylindrical wall being further adapted to provide a roof portion upon assembly of said structure, means for bringing together the open top of the cylindrical wall to close the structure after assembly and loading to provide a weather-proof enclosure and a flexible strip of rodent proof material for placement between the base of the cylindrical wall of the liner and the wire mesh.

4. Apparatus according to claim 1, 2 or 3, wherein said flexible plastic liner includes a first set of tie means for attaching the liner to said outer wall and a second set of tie means for securing closed the top of the cylindrical wall of the liner.

5. Apparatus according to claim 1, 2 or 3, including peg means for fastening said outer support wall to the ground and a hoop for permitting an aeration device to be installed in the assembled structure while at the same time providing an otherwise closed, weather-proof, enclosure.

6. A structure suitable for storage of granular materials comprising a circular outer support wall composed of a strip of wire mesh strip, a shaped, single piece, flexible, plastic liner having a circular floor extending at its periphery into a cylindrical wall with an open top, said cylindrical wall contacting and circumscribed by said outer support wall, means for bringing together the open top of the cylindrical wall to close the structure after loading with stored material to overlie said material and form a roof portion of the structure including means for closing said roof to provide a weather-proof enclosure and a flexible, generally conical, plastic cover fitted over the roof, the outer surface of said cover having a silver coating to render it reflective to sunlight.

7. A structure according to claim 6 including a flexible strip of rodent proof material located between the base of the cylindrical wall of the liner and the wire mesh.

8. A structure suitable for storage of granular materials comprising a circular outer support wall composed of a strip of wire mesh strip, a shaped, single piece, flexible, plastic liner having a circular floor extending at its periphery into a cylindrical wall with an open top, said cylindrical wall contacting and circumscribed by said outer support wall, means for bringing together the open top of the cylindrical wall to close the structure after loading with stored material to overlie said material and form a roof portion of the structure including means for closing said roof to provide a weather-proof enclosure and a flexible strip of rodent proof material located between the base of the cylindrical wall of the liner and the wire mesh.

9. A structure according to claim 6, 7 or 8 wherein said means for bringing together the open top of the cylindrical wall comprises a hoop.

10. A structure according to claim 6, 7 or 8 wherein said outer support wall is fastened to the ground by means of pegs situated at intervals in a circle and said liner is fastened to the outer wall by means of ties attached to the liner.

11. A structure according to claim 6, 7 or 8 including a protective means mounted on the top of the outer wall, said protective means adapted to protect the liner against being torn by said wall when the upper portion of the liner is opened during assembly and during loading and unloading operations.

12. A structure according to claim 6 or 7 wherein said cover includes lacing for tightening the same to conform to the shape of said roof portion of the filled structure.

13. A structure according to claim 6 or 7 wherein said cover includes a lower peripheral edge with a series of spaced apart ears projecting therefrom, and fastening means connected to each ear for holding the cover down over the roof portion, each said fastening means including a grommet fastener comprising a button and a ring consisting of a large diameter opening joined to a small diameter opening by a narrow neck portion, said button being surrounded by plastic cover material, and said ring being positioned so that the plastic material which connects the plastic material surrounding said button to the remainder of the plastic material of said cover passes through said small diameter opening in said ring.

14. A structure according to claim 6, 7 or 8 including spiral wire connectors twisted through overlapping ends of said wire mesh strip to firmly secure such ends together and form said outer support wall.

15. A method of assembling a portable structure on a surface for storage of grain, comprising the steps of
(a) marking concentric circles on said surface and inserting pegs at intervals along said circles;
(b) erecting a portion of a wire mesh outer support wall in a semi-circle immediately inside the inner of said concentric circles;
(c) fastening to the erected portion of the outer wall a portion of a flexible plastic lining having an open top;
(d) placing a flexible strip of hard material between the base of the wire mesh and the flexible plastic lining;
(e) erecting the remaining half of the wire mesh outer support wall and fastening the unattached portion of the plastic liner thereto;
(f) mounting a protective means of the top of the wire mesh support wall, and draping an upper portion of the plastic liner over the top of the outer support wall;
(g) attaching temporary anchor means between the top of the outer support wall and the pegs in the outer of said concentric circles;
(h) after filling of the structure with granular material, removing the temporary anchor means and fastening closed the open top of said plastic lining; and
(i) placing a generally conical plastic cover over the roof and fastening the same.

16. A method of assembling a portable structure on a surface for storage of material such as grain, comprising the steps of
(a) erecting a first portion of a wire mesh outer support wall in a semi-circle;
(b) fastening to the erected portion of the support wall a portion of a flexible plastic liner having a circular floor extending at its periphery into a cylindrical wall with an open top;
(c) placing a flexible strip of hard material between the base of the wire mesh and the flexible plastic lining;
(d) erecting the remaining portion of the wire mesh support wall to form a closed circle and fastening the plastic liner thereto;
(e) draping an upper portion of the cylindrical wall of the plastic liner over the top of the support wall;
(f) temporarily anchoring the top of the support wall;
(g) filling the structure with said material up to the level of the top of the support wall at the periphery with the material forming a cone towards the center, the top of the structure being entirely open during such filling step; and
(h) removing the temporary anchoring and bringing together the open top of the plastic liner over said cone to form a roof portion to enclose said material.

17. The method of claim 16 including placing a generally conical plastic cover having a sunlight reflective outer surface over the roof portion and fastening the same.

18. The method of claim 16 or 17 including mounting a protective means on the top of the wire mesh support wall prior to said draping of the liner thereover.

* * * * *